United States Patent [19]
Jacobs et al.

[11] Patent Number: 5,740,829
[45] Date of Patent: Apr. 21, 1998

[54] METHOD OF SEALING AN OUTLET OPENING

[75] Inventors: Michael Jacobs, Newcastle upon Tyne; Leigh Martin Johnson, Bonsall, both of Great Britain

[73] Assignee: British Gas plc, London, England

[21] Appl. No.: 506,609

[22] Filed: Jul. 25, 1995

[30] Foreign Application Priority Data

Jul. 26, 1994 [GB] United Kingdom ................ 9415000

[51] Int. Cl.$^6$ .......................... F16K 43/00; F16L 55/10
[52] U.S. Cl. .................... 131/15; 15/104.05; 15/104.09; 29/281.5; 29/464; 137/242; 137/318; 138/94; 138/97; 228/49.1; 269/41
[58] Field of Search .................. 137/15, 315, 317, 137/318, 242; 138/89, 94, 97; 15/104.03, 104.05, 104.09, 104.16; 29/281.1, 281.5, 281.6, 464; 228/49.1, 49.3; 269/41

[56] References Cited

U.S. PATENT DOCUMENTS

| | | | |
|---|---|---|---|
| 2,188,607 | 1/1940 | Larry et al. | 137/318 |
| 2,763,282 | 9/1956 | Reedy et al. | 137/318 |
| 2,990,731 | 7/1961 | Merrill et al. | 137/318 |
| 3,626,576 | 12/1971 | Ray | 137/318 |
| 3,669,139 | 6/1972 | Gajdos | 137/317 |
| 3,743,566 | 7/1973 | Louthan et al. | 269/41 |
| 3,799,182 | 3/1974 | Long | 137/318 |
| 3,863,667 | 2/1975 | Ward | 137/318 |
| 3,867,964 | 2/1975 | Gardner | 137/318 |
| 3,948,282 | 4/1976 | Yano | 137/318 |
| 3,966,528 | 6/1976 | Christie | 269/41 |
| 4,092,205 | 5/1978 | Mieszczak | 269/41 |
| 4,100,929 | 7/1978 | Harrison | 137/15 |
| 4,127,141 | 11/1978 | Ledonne et al. | 137/318 |
| 4,155,372 | 5/1979 | Mills et al. | 137/317 |
| 4,282,894 | 8/1981 | Mills et al. | 137/317 |
| 4,338,712 | 7/1982 | Dearman | 228/49.1 |
| 4,445,677 | 5/1984 | Hansen et al. | 269/41 |
| 4,533,424 | 8/1985 | McElroy | 269/41 |
| 4,542,892 | 9/1985 | Goldner | 269/41 |
| 4,552,170 | 11/1985 | Margrave | 137/318 |
| 4,611,743 | 9/1986 | Williams | 269/41 |
| 4,719,936 | 1/1988 | Tsubakimoto et al. | 137/318 |
| 4,828,767 | 5/1989 | Smirnoff | 137/318 |
| 5,076,311 | 12/1991 | Marschke | 137/318 |
| 5,152,310 | 10/1992 | O'Bryon | 137/318 |

FOREIGN PATENT DOCUMENTS

91-02-483 7/1991 Germany.

*Primary Examiner*—George L. Walton
*Attorney, Agent, or Firm*—Larson & Taylor

[57] ABSTRACT

An outlet opening (14) to a branch line 40 in a pipeline 10 is sealed without interrupting the flow of gas in the pipeline 10 by cutting an access opening 60 in the wall 62 of the pipeline 10 opposite the branch line 40. A seal 100 is inserted through the access opening 60 using a sub-assembly 70, which consists of a flange 74 having a screw-threaded through aperture, an externally screw-threaded tube 82 received in the aperture and a rod 80 carrying a handle 72 at one end and the seal 100 at the other. The seal 100 has a sealing face 102 which is part-cylindrical in shape and is held in the correct orientation by the handle 72 while the tube 82 is screwed home. When work on the branch line 40 has been completed a temporary seal 160 is installed in the joint-flange 16 which is welded to the pipeline 10 allowing removal of the isolation valve 64 which is replaced by a blanking flange fitted to the joint-flange 16.

8 Claims, 6 Drawing Sheets

METHOD OF SEALING AN OUTLET OPENING

This invention relates to methods of sealing an outlet opening.

The method is particularly, though not exclusively, applicable to sealing an outlet opening of a branch line in a gas transmission pipeline. Such a branch line commonly is connected to a fitting which is located on the underside of a horizontal pipeline though the pipeline need not be horizontal and the branch line may be positioned at any position around the latter.

A common requirement is to allow work to be carried out to the branch line without interrupting flow of gas through the pipeline. A known method involves the insertion of a by-pass, followed by stopping off of the pipeline on either side of the branch line. This involves considerable effort and expenditure of time. An alternative method is to shut down and depressurise the pipeline. This is not always convenient, especially during times of peak gas demand.

An object of the invention is to avoid the use of a by-pass or complete shut down of the pipeline.

According to the invention, a method of sealing the outlet opening to a branch line in a pipeline comprises using a seal applied to the outlet opening from the inside of the pipeline, a joint-flange being welded to the pipeline opposite to the branch line allowing an access opening to be cut through the wall of the pipeline and the seal to be inserted into the pipeline and applied to the outlet opening.

It is preferred that a jig is used to locate the joint-flange in relation to the pipeline to facilitate the welding of the joint-flange in the correct position.

Preferably, the seal is composed of synthetic plastics material.

Preferably, the seal has a sealing face which is of part-cylindrical shape, the radius of curvature of said face matching the radius of curvature of the inside wall of the pipeline.

Preferably, the seal is mounted at one end of a red inserted through a hollow externally screw threaded tube, which is screwed through an internally screw threaded flange plate secured on an isolation valve secured on the joint-flange, the rod being prevented from rotating while the tube is screwed to advance the seal into position.

An embodiment of the method according to the invention will now be described by way of example with reference to the accompanying drawings in which.

Figure 1:
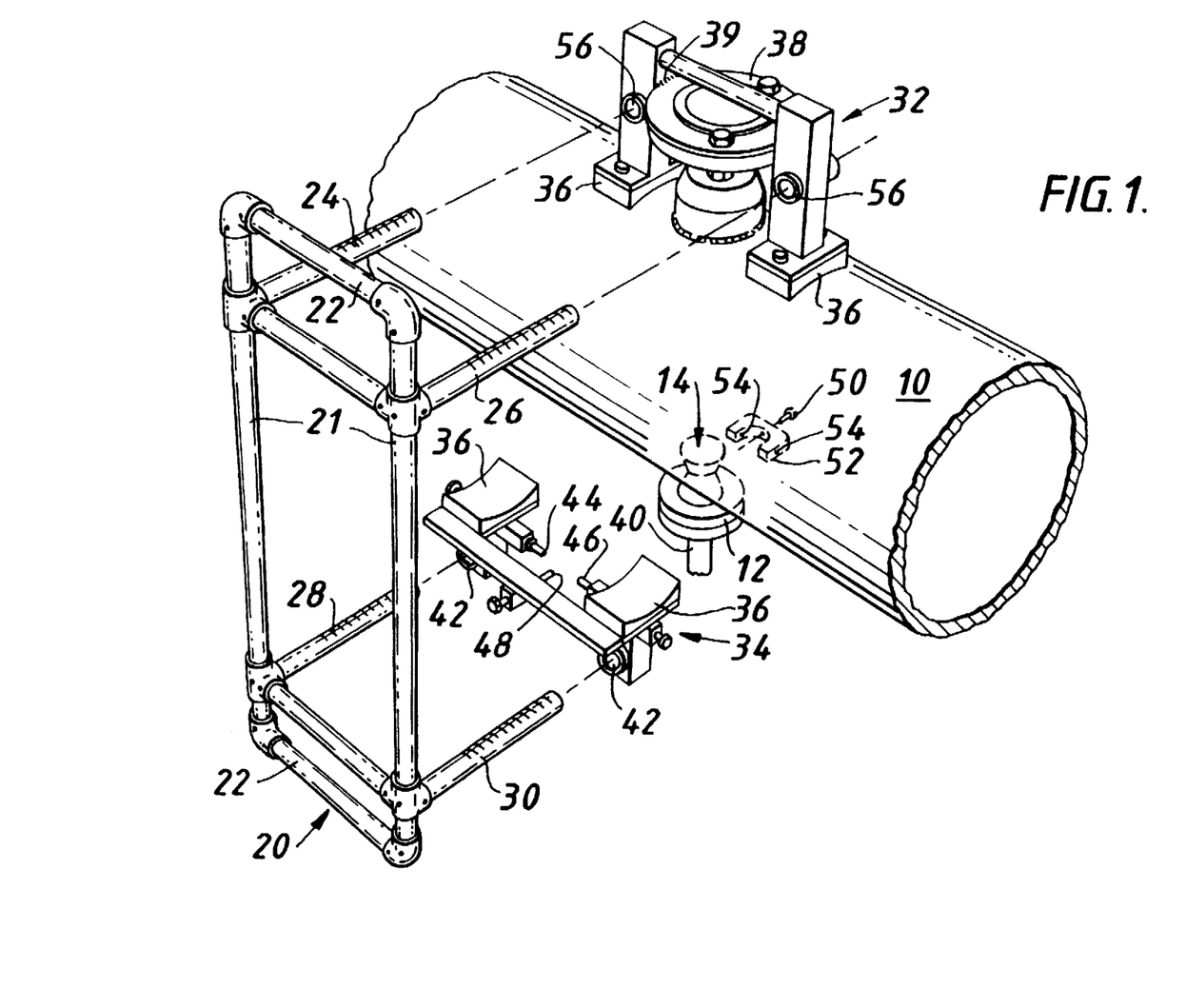
FIG. 1 shows the pipeline with a fitting to which a branch line is connected and the joint-flange together with an exploded view of a jig used to position the joint-flange correctly on the pipeline opposite to the fitting.

FIG. 1 shows part of a gas transmission pipeline 10 having a fitting 12 located at its underside. The requirement is to seal the outlet opening 14 to the branch line without the need to interrupt the flow of gas through the pipeline 10.

The first step (shown in FIG. 1) is to weld a joint-flange 16 to the pipeline 10 opposite to the fitting 12. To ensure that the joint-flange 16 is accurately fitted at the correct position, a jig 20 is used. The jig 20 comprises a rectangular frame having sides 21 and ends 22 having four parallel arms 24, 26, 28, 30, which can be moved in pairs along the frame sides 21 and clamped in position.

An upper bridge 32 is slidable on the upper arms 24, 26. A lower bridge 34 is slidable on the lower arms 28, 30.

The jig 20 is used as follows:

1. Four shoes 36 are selected to match the external curvature of the pipe 10, two shoes 36 being bolted to the upper bridge 32 and two to the lower bridge 34;
2. The joint-flange 16 is bolted to a fixing flange 38, which is welded to the upper bridge 32 at 39 and positioned on the pipeline 10 approximately opposite to the branch line 40;
3. The lower bridge 34 is assembled upon the lower jig arms 28, 30 with the short side 42 of the mounting bosses towards the jig sides 22 and clamped in position to suit the size of pipeline 10. The arms 28, 30 are engraved with the various pipe sizes. Adjust the branch line clamping screws 44, 46, 48 and 50 to a central gap of approximately 130 millimeters. Note that the fourth branch line clamping screw is received in a keep 52 which has side-apertures 54 allowing the screws 44 and 46 to pass through the keep 52.
4. Unclamp the lower arms 28, 30 and move them to the lowest position on the sides 21. Leave the arms unclamped;
5. The upper arms 24, 26 are now set to position to suit the pipe size indicated on the sides 21 and are now clamped in place;
6. The jig 20 is next offered up to the pipeline 10 and the upper arms 24, 26 are located in the bosses 56 of the upper bridge 32. The sides 21 are pushed up against the pipeline 10 and the upper bridge 32 is clamped onto the upper arms 24, 26;
7. The lower bridge 34 and lower arms 28, 30 are now raised so that the lower shoes 36 fit closely around the underside of the pipeline 10 and the lower arms 28, 30 are lightly clamped in position;
8. The jig 20 is slid along the pipeline 10 until the centre-line of the branch clamping screws 44, 46, 48 and 50 is aligned with the centre-line of the branch 40; the lower arms 28, 30 are then clamped firmly in position;
9. The jig 20 is held in position while the branch clamping screws 44, 46, 48 are adjusted until all three screws engage the narrow part of the fitting 12 to which the branch 40 is connected;
10. The joint-flange 16 is next tack-welded to the pipeline 10;
11. The jig 20 is unbolted from the joint-flange 16 and removed and the joint-flange 16 is fully welded to the pipeline 10.

The next stage in the method (shown in FIG. 3) is to cut an access hole 60 through the wall 62 of the pipeline 10. To do this an isolation valve 64 is fitted on top of the joint-flange 16 and secured by bolts 66. Next, a drilling machine (not shown) is fitted on top of the isolation valve 64. The valve is opened and the access hole 60 is cut using the drilling machine.

Figure 3:
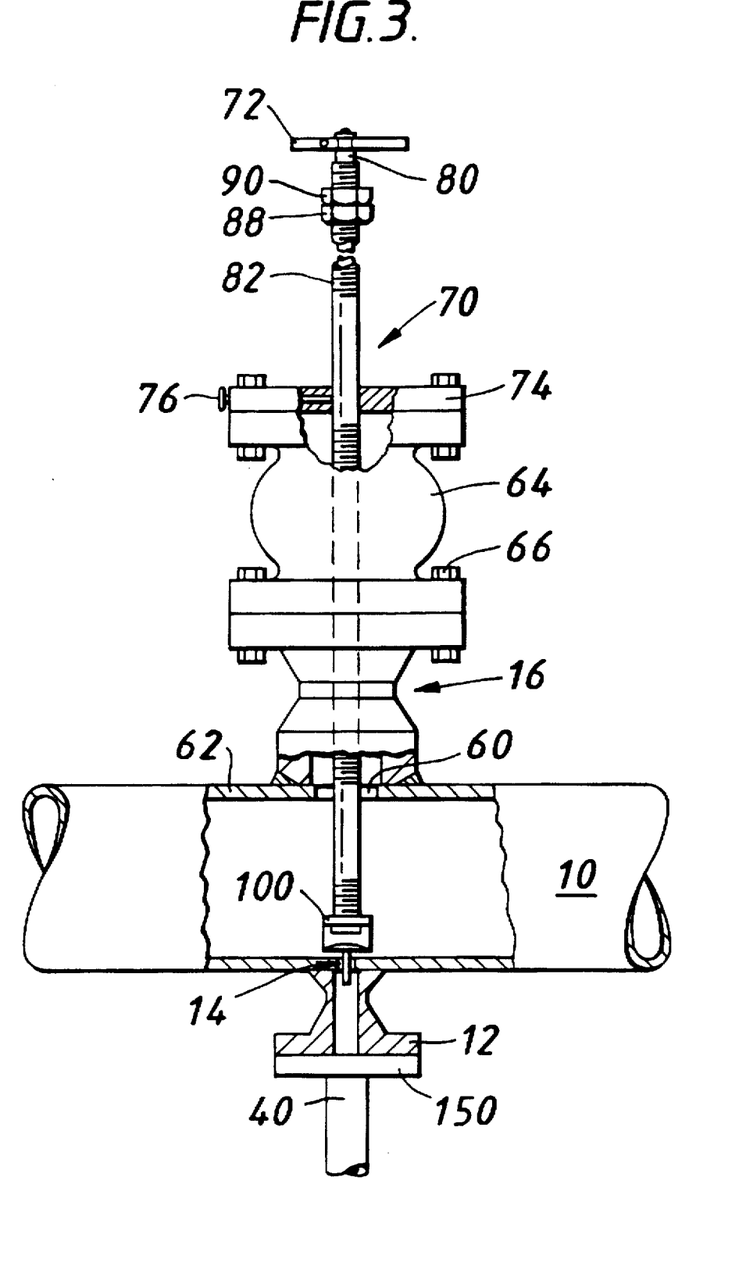
FIG. 3 is a side-elevation similar to FIG. 2 but showing the seal about to be positioned at the outlet opening.

The drill is withdrawn, the valve is closed and the drilling machine is removed.

Next, a magnet is used to clear metal cuttings from the area around the branch line outlet 14.

Next, an insertion rod sub-assembly 70 is fitted to the isolation valve 64. A brush 87 is secured to the lower end of the sub-assembly and used to clean the area of the inner wall of the pipeline 10 around the branch outlet 14. The tee bar handle 72 is turned manually to rotate the brush.

The sub-assembly includes a flange 74 having a grease injection point 76. Grease is injected through the point 76 into the thread connection in the flange 74. This can be used to stop any escape of gas leaking from the threads.

The sub-assembly is withdrawn after the cleaning step has been completed and the valve 64 is closed. The flange 74 and the sub-assembly can then be removed.

Figure 4:
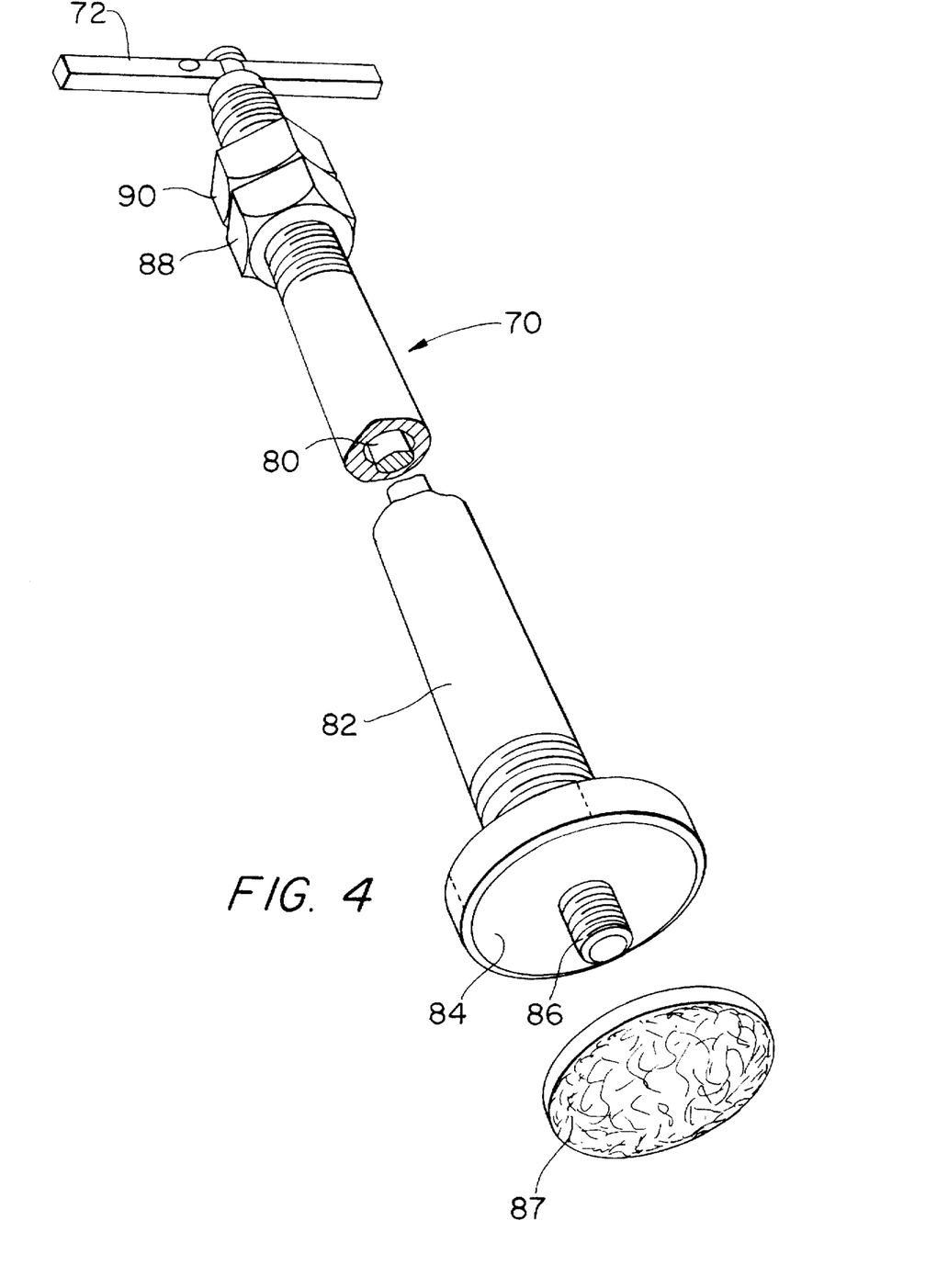
FIG. 4 is an enlarged view of the insertion rod sub-assembly.

FIG. 4 shows the sub-assembly 70 in more detail (note that the flange 74 is not shown). The sub-assembly 70 comprises a rod 80 which extends through a hollow tube 82 having an external screw-thread. At its upper end the rod 80 carries the tee-handle 72. At its lower end the rod 80 carries a seal support bush 84 and the rod 80 protrudes at 86 through the bush 84. The protruding end has an external screw thread. The tube 82 carries a pair of nuts 88, 90 which are locked together and afford anchorage for a spanner (not shown) to enable the tube 82 to be turned.

Figure 5:
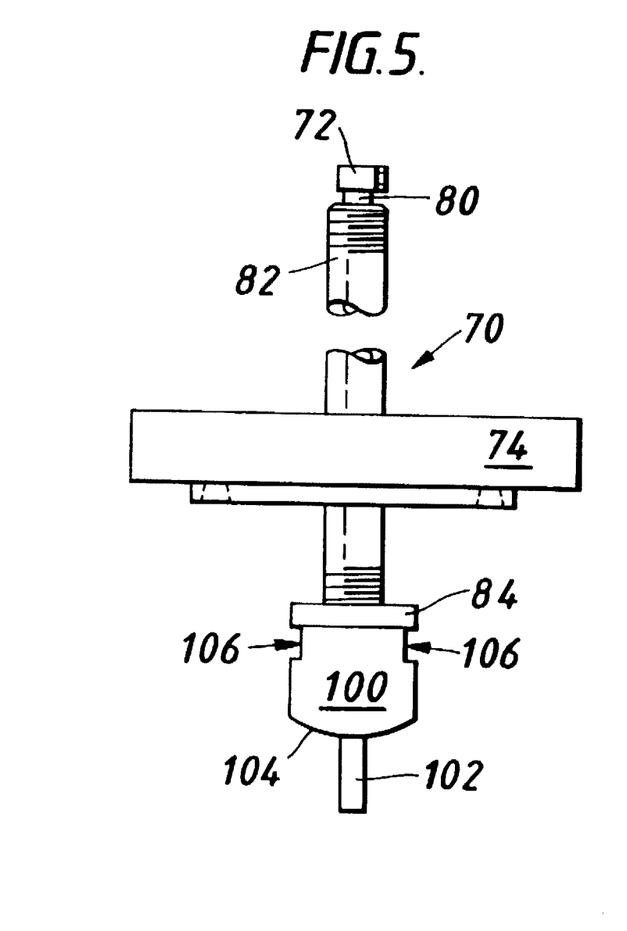
FIGS. 5 and 6 are vertical elevations of the insertion rod sub-assembly showing the seal in two positions, one at right angles to the other.
Figure 6:
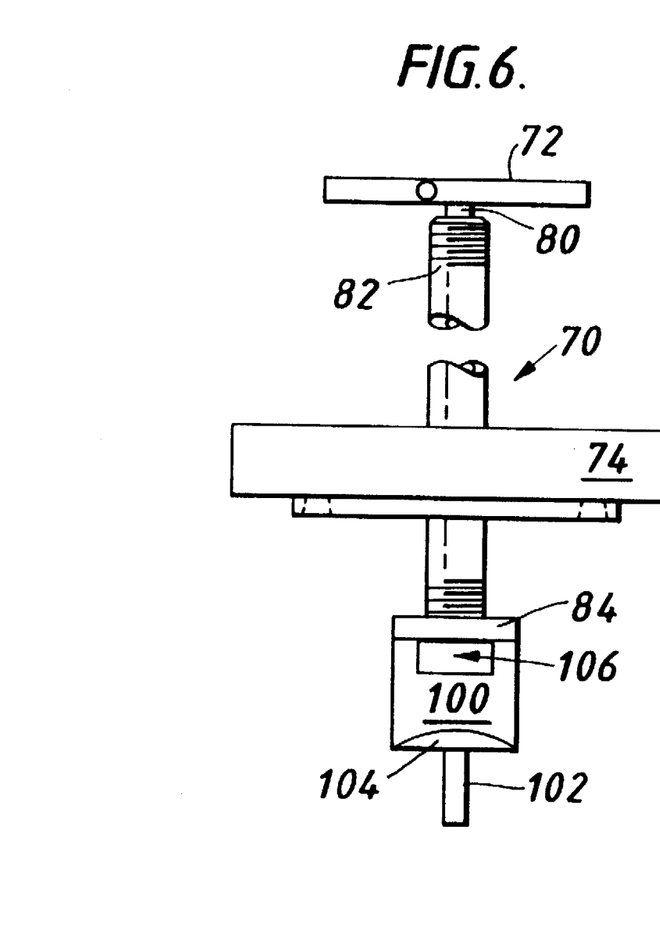

FIGS. 5 and 6 show the sub-assembly 70 in two positions 90° different from one another. In FIGS. 5 and 6 the sub-assembly 70 is equipped with a seal 100 shown in FIG. 2. The tube 82 can be screwed downwardly through the flange 74.

The seal 100 carries a guide pin 102 projecting from its lower end.

The seal 100 is composed of synthetic plastic material e.g. polytetrafluoroethylene. The seal 100 has a lower sealing face 104 which is part cylindrical in shape. The radius of curvature of the face 104 is chosen to match the radius of curvature of the inside of the pipewall 62.

The tee-handle 72 is so arranged on the red 80 that it is parallel to the two flats 106 on the seal 100.

Figure 2:
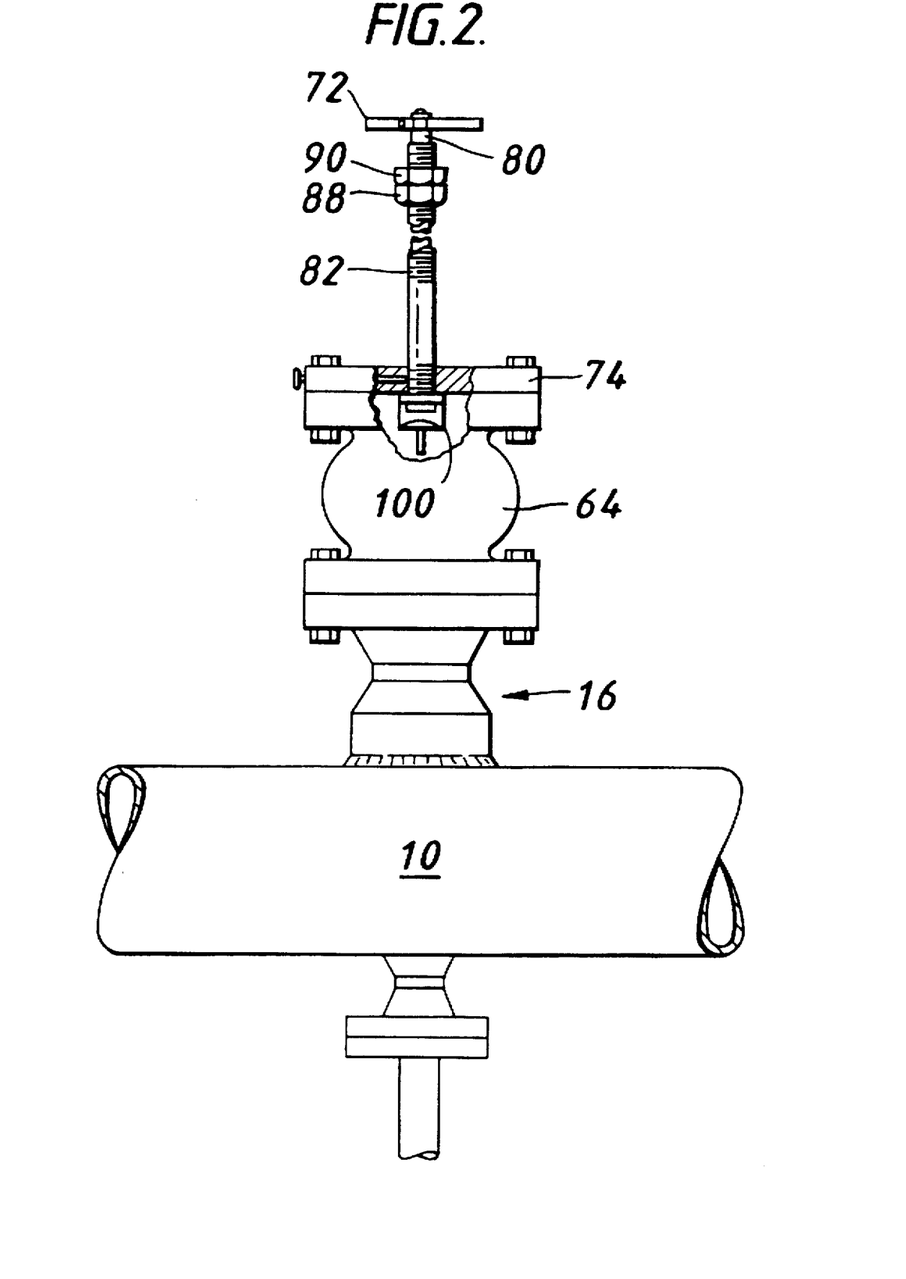
FIG. 2 is a side elevation, partly in vertical section, of the part of the pipeline, shown in FIG. 1, showing the joint-flange and an isolation valve, with the seal in position to be applied to the outlet opening by an insertion rod sub-assembly.

The sub-assembly 70 shown in FIGS. 5 and 6 is next fitted to the isolation valve 66 as shown in FIG. 2.

The seal 100 is fully retracted up to the flange. The distances A and B shown in FIG. 2 are measured. The distance A is subtracted from the distance B. The thickness of the pipewall 62 (FIG. 3) and the bore of the pipeline are added to the difference between B and A. The result is the distance the seal 100 should travel to contact the lower inside wall of the pipeline 10.

The isolation valve 64 is next opened and the seal 100 is screwed into the pipeline 10 using a spanner (not shown) engaged with the nut 90 to turn the tube 82. This is continued until the seal 100 is approximately 10 mm from the lower inner wall of the pipeline 10. The correct orientation of the seal is ensured by aligning the tee bar handle 72 with the axis of the pipeline 10.

The tee bar handle 72 is held in this correct position while the tube 82 is turned using the spanner until the seal 100 locates and seals against the pipeline inner wall around the outlet opening 14.

If gas should leak from the thread connection at the flange 74 grease should be injected at the point 76, as already referred to.

A check is now made for an adequate seal between the seal 100 and the pipeline wall be venting the branch line 40.

If an adequate seal has not been achieved, the tube 82 can be screwed in further. However, care must be taken to ensure that the maximum torque of, say, 65 Newton-meters is not exceeded.

Once an adequate seal has been achieved, work can now be carried out on the branch line 40. For example, the branch line 40 which, as is commonly the case, was originally installed during the days of towns' gas usage, can now be removed by disconnecting the branch flange 150 from the flange of the fitting 12.

Figure 7:
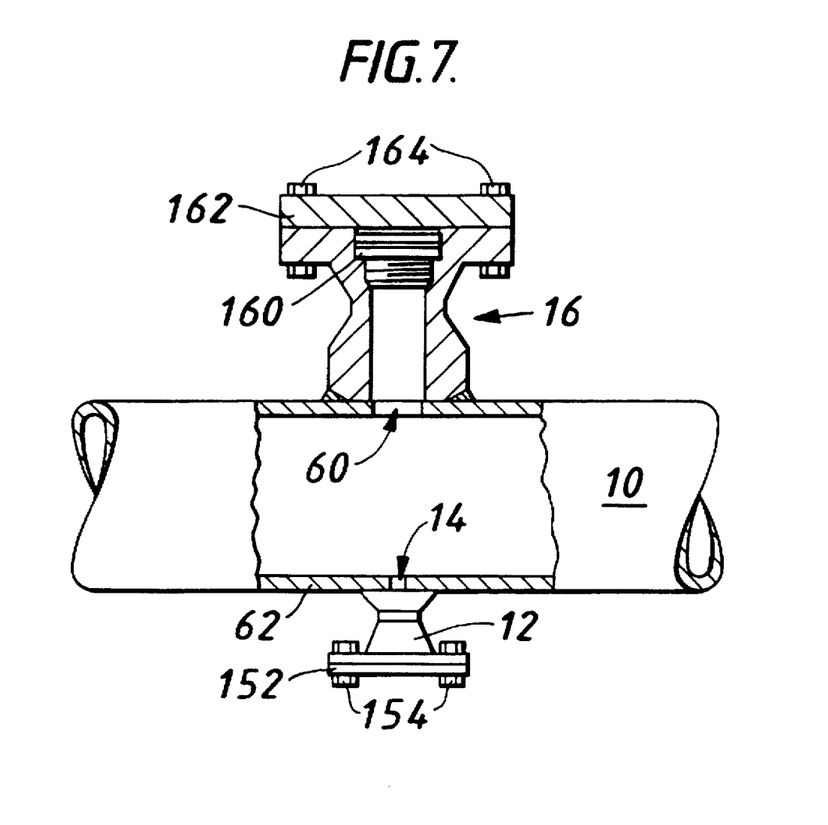
FIG. 7 is a side elevation, partly in vertical section, of the part of the pipeline shown in FIGS. 1 and 2 but showing a blanking flange fitted to the joint-flange after work on the branch line has been completed.

FIG. 7 shows the position after all work on the branch line 40 has been completed. A blanking flange 152 has been fitted to the fitting 12 and secured by bolts 154. This work was completed while the seal 100 was in position closing the outlet 14.

Finally, the insertion rod sub-assembly 70 was withdrawn and the isolation valve 64 closed. The sub-assembly was removed from the valve 64.

Equipment which need not be described in detail here was fitted to the isolation valve 64 and used to install a plug 160 in the joint-flange 16. The plug 160 effects a temporary seal, allowing the equipment to be removed from the valve 64 and also allowing the valve 64 itself to be removed from the joint-flange 16.

Then, a blanking off flange 162 was fitted to the joint-flange 16 and secured by bolts 164.

We claim:

1. A method of sealing an outlet opening to a branch line in a pipeline by applying a seal to the outlet opening from inside of the pipeline, said branch line being in fluid communication with said pipeline, the method comprising the steps of welding a joint-flange to the pipeline opposite to the branch line, using a jig to locate said joint-flange in relation to the pipeline so as to facilitate the welding of the joint-flange in the correct position, cutting an access opening through the wall of the pipeline opposite and in alignment with the outlet opening, inserting the seal into the pipeline through the access opening and applying the seal solely across the outlet opening interiorly of the pipeline so as to block communication between said branch line and said pipeline.

2. A method according to claim 1, wherein the seal is composed of synthetic plastics material.

3. A method according claim 1, wherein the seal has a sealing face which is of part-cylindrical shape, the radius of curvature of said face matching the radius of curvature of the inside wall of the pipeline.

4. A method according claim 1, wherein said seal is mounted at one end of a rod inserted through a hollow externally screw threaded tube, which is screwed through an internally screw threaded flange plate secured on an isolation valve secured on the joint-flange, the rod being prevented from rotating while the tube is screwed to advance the seal into position.

5. A method according claim 1, wherein prior to applying the seal, the inside wall of the pipeline around the outlet opening is brushed by a brush inserted through the access opening.

6. A method according to claim 6, wherein the brush is mounted at one end of a rod inserted through said access opening.

7. A method according to claim 1, when work on the branch line has been completed, locating a closure plug in the joint-flange, removing the isolation valve and fitting a blanking flange to the joint-flange.

8. A method according to claim 1, comprising the following steps:
 (i) welding a joint-flange to the pipeline opposite to the branch line using said jig to locate the joint-flange before it is welded;
 (ii) fitting an isolation valve to the joint flange;

(iii) fitting a drilling machine to the isolation valve;
(iv) using the drilling machine to cut an access opening in the wall of the pipeline opposite to the outlet opening;
(v) removing the drilling machine;
(vi) fitting an insertion rod sub-assembly to the isolation valve;
(vii) using the sub-assembly to brush the inside wall of the pipeline around the outlet opening;
(viii) using the sub-assembly to position and apply a seal to the outlet opening;
(ix) removing the sub-assembly;
(x) locating a closure seal in the joint-flange;
(xi) removing the isolation valve; and
(xii) fitting a blanking flange to the joint-flange.

* * * * *

UNITED STATES PATENT AND TRADEMARK OFFICE
CERTIFICATE OF CORRECTION

PATENT NO. : 5,740,829
DATED      :      Apr. 21, 1998
INVENTOR(S): Michael Jacobs
             Leigh Martin Johnson It is certified that error appears in the above-indentified patent and that said Letters Patent is hereby corrected as shown below:

column 1 line 39 delete " red " and insert --rod-- column 2 line 2 delete " nnderside " and insert --underside-- column 3 line 37 delete " red " and insert --rod-- claim 6 line 1 delete " claim 6 " and insert --claim 5--

Signed and Sealed this

Twenty-second Day of September, 1998

*Attest:*

BRUCE LEHMAN

*Attesting Officer*   *Commissioner of Patents and Trademarks*